(12) United States Patent
Sachse

(10) Patent No.: US 9,884,982 B2
(45) Date of Patent: Feb. 6, 2018

(54) ABRASIVE GRAIN BASED ON MELTED SPHERICAL CORUNDUM

(75) Inventor: Sebastian Sachse, Villach (AT)

(73) Assignee: Center for Abrasives and Refractories Research & Development C.A.R.R.D. GmbH, Villiach (AT)

(*) Notice: Subject to any disclaimer, the term of this patent is extended or adjusted under 35 U.S.C. 154(b) by 821 days.

(21) Appl. No.: 12/226,844

(22) PCT Filed: Apr. 25, 2007

(86) PCT No.: PCT/EP2007/003638
§ 371 (c)(1),
(2), (4) Date: Oct. 28, 2008

(87) PCT Pub. No.: WO2007/124905
PCT Pub. Date: Nov. 8, 2007

(65) Prior Publication Data
US 2009/0139149 A1 Jun. 4, 2009

(30) Foreign Application Priority Data

Apr. 28, 2006 (DE) .................. 10 2006 020 362

(51) Int. Cl.
*C09K 3/14* (2006.01)

(52) U.S. Cl.
CPC .......... *C09K 3/1436* (2013.01); *C09K 3/1427* (2013.01)

(58) Field of Classification Search
CPC ............................... C09G 1/02; C09K 3/1409
USPC ........................................... 51/298, 308, 309
See application file for complete search history.

(56) References Cited

U.S. PATENT DOCUMENTS

| | | | | |
|---|---|---|---|---|
| 1,871,792 A | | 8/1932 | Horsfield | 423/133 |
| 1,871,793 A | | 8/1932 | Horsfield | 423/625 |
| 2,252,587 A | * | 8/1941 | Martin et al. | 51/298 |
| 2,261,639 A | | 11/1941 | Benner et al. | 428/402 |
| 2,301,123 A | * | 11/1942 | Klein | 51/309 |
| 2,340,194 A | | 1/1944 | McMullen | 501/80 |
| 2,527,044 A | * | 10/1950 | Walton et al. | 51/308 |
| 2,595,733 A | * | 5/1952 | Martin et al. | 51/298 |
| 2,986,455 A | | 5/1961 | Sandmeyer | 51/296 |
| 4,132,533 A | * | 1/1979 | Lohmer et al. | 51/295 |
| 4,472,173 A | * | 9/1984 | Bruning et al. | 51/298 |
| 4,799,939 A | * | 1/1989 | Bloecher et al. | 51/293 |
| 4,930,266 A | * | 6/1990 | Calhoun et al. | 51/293 |
| 5,011,508 A | * | 4/1991 | Wald et al. | 51/293 |
| 5,042,991 A | | 8/1991 | Kunz | 51/295 |
| 5,102,429 A | * | 4/1992 | Wald et al. | 51/295 |
| 5,116,392 A | | 5/1992 | Selgrad et al. | 51/309 |
| 5,213,591 A | * | 5/1993 | Celikkaya et al. | 51/293 |
| 5,352,254 A | * | 10/1994 | Celikkaya | 51/295 |
| 5,474,583 A | * | 12/1995 | Celikkaya | 51/309 |
| 5,611,828 A | * | 3/1997 | Celikkaya | 51/309 |
| 5,628,806 A | * | 5/1997 | Celikkaya et al. | 51/309 |
| 5,641,330 A | * | 6/1997 | Celikkaya et al. | 51/309 |
| 5,653,775 A | * | 8/1997 | Plovnick et al. | 51/309 |
| 5,738,695 A | * | 4/1998 | Harmer et al. | 51/295 |
| 5,962,082 A | * | 10/1999 | Hendrickson et al. | 427/547 |
| 6,037,019 A | * | 3/2000 | Kooyer et al. | 427/598 |
| 6,613,114 B1 | | 9/2003 | Alary | 51/309 |
| 6,811,582 B1 | * | 11/2004 | Wurzer et al. | 51/307 |
| 7,381,466 B2 | | 6/2008 | Zeiringer et al. | 428/403 |
| 2006/0134421 A1 | | 6/2006 | Zeiringer et al. | 428/403 |

FOREIGN PATENT DOCUMENTS

| | | | | |
|---|---|---|---|---|
| DE | 628 936 | | 4/1936 | ............... C09K 3/14 |
| DE | 1 281 306 | | 10/1968 | ............... B24D 3/34 |
| DE | 134 638 A1 | | 3/1979 | ............... C04B 35/62 |
| DE | 31 47 597 C1 | | 2/1983 | ............... C09K 3/14 |
| EP | 1 157 077 | | 8/2002 | ............... C01F 7/02 |
| GB | 284 131 | | 1/1928 | ............... B01J 2/06 |
| JP | 53149203 A | * | 12/1978 | |
| JP | 56102477 A | * | 8/1981 | ............... B24D 3/00 |
| RO | 106244 B1 | * | 3/1993 | |
| SU | 390047 A | * | 11/1973 | |
| SU | 582958 A | * | 12/1977 | |
| WO | WO 96/14187 | | 5/1996 | ............... B24D 3/28 |
| WO | WO 2004/053013 A2 | | 6/2004 | ............... C09K 3/14 |
| WO | WO 2007094703 A1 | * | 8/2007 | |

OTHER PUBLICATIONS http://mst-online.nsu.edu/mst/ceramics/ceramics2.htm.*

* cited by examiner

*Primary Examiner* — Kaj K Olsen
*Assistant Examiner* — Ross J Christie
(74) *Attorney, Agent, or Firm* — Finnegan, Henderson, Farabow, Garrett & Dunner LLP

(57) ABSTRACT

An abrasive grain made from melted spherical corundum where the abrasive grain consists of a spherical corundum core, coated with an encircling layer of a binder and fine-grained abrasive solid particles.

16 Claims, No Drawings

US 9,884,982 B2

ABRASIVE GRAIN BASED ON MELTED SPHERICAL CORUNDUM

CROSS-REFERENCE TO RELATED APPLICATIONS

Pursuant to 35 U.S.C. § 371 and § 365, this U.S. application is a National Stage of, and claims the benefit of priority to, PCT Application No. PCT/EP2007/003638 filed Apr. 25, 2007, and published by WIPO under Publication No. WO 2007/124905 A2; said PCT application claims the benefit of priority to German Patent Application No. 10 2006 020 362.3 filed Apr. 28, 2006. Both prior applications are titled Schleifkorn auf Basis von geschmolzenem Kugelkorund.

FIELD OF THE INVENTION

This invention relates to an abrasive grain made from melted spherical corundum, where the abrasive grain consists of a spherical corundum core, coated with an encircling layer of a binder and fine-grained abrasive solid particles.

BACKGROUND OF THE INVENTION

Abrasive grain has been known for approx. 75 years and has been manufactured on a commercial scale for approx. 30 years. Thus, U.S. Pat. Nos. 1,871,792 and 1,871,793 describe the back-filling of a pouring stream of liquid corundum by means of compressed air or steam, creating hollow corundum spheres approx. 0-5 mm in diameter. In the above-referenced US documents all essential steps currently applied in the manufacturing process have already been described. Numerous additional patents describe the use of hollow spheres created by this process. DE 628 936, for example, describes the pulverization and glazing of the hollow spheres into abrasive granules that are subsequently manufactured into grinding tools.

Owing to the high porosity of the material and the low firmness of the hollow spheres, the processing into abrasive grain yields relatively fine grain, suitable only for a limited number of uses. However, with fine-graining necessarily occurring during the conventional processing of fused corundum, the manufacture of abrasive grains from hollow-sphere corundum makes little economic sense.

The manufacturing process of conventional abrasive grain corundum begins with alum or bauxite being melted in an electric arc furnace. Subsequently, the melted corundum is cooled, having produced blocks that weigh 10 to 15 tons. Following a 2- to 5-day complete cooling process, these corundum blocks are crushed by crushers and rollers and the resulting material is then filtered out as abrasive grains. Therefore, an essential portion of the costs involved in producing corundum is attributed to the crushing process and wear and tear sustained while crushing corundum blocks having diameters up to several meters and then abrasive grains ranging in size from a few micrometers to a few millimeters. Therefore, attempts were made in the past time and again to avoid the expensive crushing procedure by dispersing the liquid melted corundum as early as prior to its solidification.

As mentioned above, however, back-filling a pouring stream of melted metal consisting of liquid corundum creates porous hollow-sphere corundum that is ill suited as abrasive grain.

Thus, because of its low thermal conductivity, chemical inertia, and porosity, it is currently used mainly as fire resistant material. Utilization of spherical corundum by the refractory industry was first described in U.S. Pat. No. 2,261,639.

By contrast, the abrasives industry uses spherical corundum mainly as pore-forming material in the production of grinding wheels, rather than abrasive grain. Such grinding tools are, for example, described in U.S. Pat. No. 2,986,455 or DE 1 281 306.

Regardless, back-filling of corundum was resumed time and again as a means to manufacture abrasive grain. U.S. Pat. No. 2,261,639, for example, describes melted material consisting of aluminum oxide with an additive of 1-10% sodium oxide, back-filled with air, yielding compact crystalline spheres that can be utilized as abrasive material after being crushed. Large portions of sodium oxide produce sodium aluminates, substantially reducing the performance of the abrasive grain.

U.S. Pat. No. 2,340,194 describes the addition of 1-1.5% of titanium oxide in the melted material, supposed to produce compression-proof hollow spheres with relatively thick walls. DD 134 638 describes a method for the production of corundum hollow spheres, whereby the characteristics of the corundum hollow sphere are affected by added nitrite-bound nitrogen in 5 the form of aluminum nitride or aluminum oxynitride.

GB 284 131 describes a method in which liquid corundum is first blown into a cooling chamber by means of airflow, where individual particles undergo additional cooling by a flow of cool water. This produces particles of approx. 3 mm in diameter. EP 1 157 077 describes the production of polycrystalline abrasive grains, where the liquid corundum is cast and the cooling process is aided by the dispersion of the melted aluminum oxides into small drops with the use of ultrasound. This method yields dense particles with a medium diameter of less than 1 mm. The crystallite property of these particles ranges below 30 µm.

The methods of the state of the art mentioned have the disadvantage that they either attempt to influence the physical characteristics such as porosity and density of the desired product by means of chemical composition, logically resulting in a change in the chemical composition of the product, thereby often reducing the performance of the product as an abrasive grain, or the attempt is made to affect the physical properties of the product by way of technical procedural variations, which generally involves a great increase in technical effort, resulting in high production costs, so that to date none of the above-mentioned methods of a direct production of abrasive grain has been successful.

SUMMARY OF THE INVENTION

Therefore, the need for a method of manufacturing an abrasive grain directly from melted material without the costly crushing process continues.

The object of this invention is therefore to provide a method that does not entail the disadvantages of the state of the art technology, i.e., a method that allows the production of an efficient abrasive grain by simplified means without the need of going through the usual costly crushing process.

This object can be accomplished with a method characterized by features contained in claim 13, as well as an abrasive grain with the properties according to claim 1.

Further developments and embodiments of the inventive concept are the subjects of the dependent claims.

DETAILED DESCRIPTION OF THE PREFERRED EMBODIMENTS

Surprisingly, it has been found that coating the conventional porous spherical corundum with a layer of fine-grained, abrasive solid particles, together with a binder and subsequent tempering of the coated spherical corundum produces a porous, essentially spherical solid, possessing outstanding features of abrasive grain.

Thus, the additional coating provides the spherical corundum with features that make it suitable for use as an abrasive grain.

Initially, the specific surface is increased through the use of fine-grained solid particles, which improves the integration of the spherical corundum into the abrasive material, such as in a grinding disk or in abrasive materials placed on a support. The coating yields specific surfaces of 0.1 to 0.3 m²/g. This raises the surface of the coated corundum by approx. twenty times as compared with uncoated corundum.

Owing to the additional micro-porous coating, the abrasive grain of the invention possesses an extraordinarily high overall porosity, with open porosity ranging between 10 and 30% and closed porosity between 60 and 90%, with a ratio R of the overall porosity resulting from the sum of open porosity and closed porosity to the open porosity, calculated based on the following formula:

$$R = \frac{(\text{Porosity open} + \text{porosity closed})}{\text{Porosity open}}.$$

R indicates values between 3 and 10.

Based on its high porosity, the invention's abrasive grain has a relatively low bulk density, with 0.5-1 kg/l clearly ranging below the usual values for abrasive grain.

The porosity values are measured by means of mercury porosimetry and digital image analysis, while the bulk density was conventionally gauged by liters and weight of abrasive grain.

Binders used can be organic as well as inorganic. For the implementation of this invention inorganic binder is preferred, specifically, silicate binder and/or phosphatic binder.

Depending upon the purpose the abrasive grain, organic binder can be used as well, with synthetic resin being the preferred binder. The amount of binder, as relating to the overall solid-material quantity of abrasive grain, is from 0.05 to 10 weight-percent. Frequently, relatively increased quantities of binder are used, because the coating layer is relatively thick, and corresponding amounts of binder need to be applied, in order to achieve the solidity required for abrasive grain.

The coating itself consists mainly of fine-grained abrasive solid particles, with special fused alumina, standard corundum, semi-friable aluminum, or zirconic corundum being preferred. However, preferred variants may also contain zirconic mullite, silicon carbide, diamond and/or cubic boron nitride. Sizes of solid particles range from 0.1 to 100 μm. In preferred variants the medium size of solid particles ranges from 3 to 25 μm.

As mentioned above, the invention's abrasive grain is coated by a relatively thick layer, the share of abrasive solid particles ranging from 20 to 40 weight-percent, relative to the overall solid-matter portion of the abrasive grain. The thickness of the layer itself ranges from 50 to 500 μm, preferably between 150 and 300 μm, and amounts to many times the prevailing medium grain-size of solid particles with regard to this invention. Therefore, it is essential to the invention for the coating to have several layers of solid particles. Experience has shown that only then will the coated spherical corundum achieve the solidity necessary to be effective as an abrasive grain.

Depending upon the particular application, it can be useful to add further additives to the coating layer besides the binder and fine-grained abrasive solid matter, such as sintered additives, cement forming and/or grinding active substances. The additives are preferably mixed together with the fine-grained solid matter prior to applying the latter to the spherical corundum.

The production of the invention's abrasive grain is relatively simple and cost-effective. The spherical corundum itself is produced via conventional means by back-filling the melted liquid with an air-water mixture. The resultant porous sphere-shaped $Al_2O_3$ parts are mixed with a binder in a positive mixer. Subsequently, the fine-grained abrasive solid-matter particles are added to the binder-moistened spherical corundum and cling to its surface. As soon as the surrounding coating has reached the desired thickness, the coated porous sphere-shaped $Al_2O_3$ parts are subjected to thermal treatment, in order to harden the coating.

The type of binder that is applied depends upon the intended use of the abrasive grains. If its application is planned for ceramic-bonded grinding wheels, inorganic binders are preferred, while using a particularly sodium favorable silicate variation, available in large quantities at reasonable prices. When using inorganic binders, the subsequent thermal treatment is administered at temperatures ranging from 400 to 1400° C., where the binder, together with the fine-grained abrasive solids, is sintered into a solid layer.

If the coated spherical corundum is to be used in grinding wheels bonded by synthetic resin, it is also possible to use organic binder—preferably the type of binder used as binder in the grinding wheel itself. Such organic binding systems are cured at from 200 to 500° C. Organic binders are also suitable for coating spherical corundum to be used in supported abrasives.

By means of supplemental additives, the abrasive property, sinter characteristics, and/or binder formation of the abrasive grain according to the invention can be improved. As an advantageous feature, while using synthetic resin as a binder, additional active abrasives can be applied, such as sulfides, carbonates, halogenides or other substances that promote the grinding process. While using inorganic binders, sinter additives or cement molders can be added, furthering the solidification of the coating itself.

The solidity of the coated spherical corundum can be determined by the so-called CFF Test (Compressive Fracture Force Test). In this test, an individual coarse abrasive grain is crushed by a hydraulic plunger and the force necessary to destroy the abrasive grain is measured. This process enables the determination that the spherical corundum according to the invention surpasses the solidity of an uncoated spherical corundum by 3 to 5 times, thereby ranging within the stability of conventional fused corundum.

By coating the spherical corundum, the aforementioned method thus succeeds in producing abrasive grains that can be easily adapted to any type of application, owing to the numerous coating variations available.

Below is an elaboration of this invention in detail, based on several selected examples.

Example 1

Production of a Coated Spherical Corundum 63 kg spherical corundum (ALODUR KKW, Treibacher Schleifmittel AG) with medium-sized particle of 2-3 mm were mixed in a positive mixer, together with a 6 kg 1:1 mixture of sodium silicate and water, until the surface of the spherical corundum was evenly moistened. To this mixture was added 27 kg standard corundum (ESK P1400, Treibacher Schleifmittel AG) with a maximum particle size of 20 μm. This mixture was homogenized for approx. 2-3 minutes. The homogenously coated corundum spheres produced by this method were dried at 50° C. and subsequently sintered at 1300° C. in a revolving tubular kiln. They remained in the sintering furnace for approx. 20 minutes. The medium layer thickness of the coating was assessed by electron microscope as approx. 250 μm Example 2

Grinding Test (Surface Grinding)

The abrasive grains produced in Example 1, together with grain-size F46 standard abrasive grains, were worked into a resin-bonded grinding segment, the proportion of standard corundum:abrasive grain (Example 1) being 3:1. The properties of the grinding segment amounted to 280×55 mm, with the surface of the abrasive bonded product measuring 0.059 m². Grinding segments with different degrees of hardness were produced. (G and H).

These grinding segments were tested against a work piece of plain high-carbon steel (1018) with a work-piece surface of 0.206 m². By way of comparison, analogous segments were employed, to which a conventional spherical corundum instead of a coated spherical corundum was applied.

The segments were subjected to surface grinding with a machine-tool output of 18.4 kW and 36.8 kW, a cutting speed of 18 R.P.M., an in-feed speed of 0.5 mm/min, and total infeed of 10.2 mm. The grinding results are summarized in the following Table 1:

TABLE 1

| | Performance | | | | | | | |
|---|---|---|---|---|---|---|---|---|
| | 18.4 kW | | | | 36.8 kW | | | |
| | Hardness/Solidity | | | | | | | |
| | G | | H | | G | | H | |
| Sample | B1* | V1* | B1 | V1 | B1 | V1 | B1 | V1 |
| Erosion | 3.8 | 3.2 | 4.2 | 3.2 | 6.7 | 5.4 | 7.6 | 5.6 |
| Wear | 7.3 | 6.9 | 7.1 | 6.6 | 7.6 | 7.3 | 7.6 | 7.1 |
| G-factor** | 1.8 | 1.6 | 2.1 | 1.7 | 3.1 | 2.6 | 3.5 | 2.8 |

*B1 = sample with coated spherical corundum, according to Example 1; V1 = comparable examples with conventional spherical corundum
**The G-factor is calculated from erosion × work-piece surface/wear × surface of abrasive product As demonstrated by the results in Table 1, by using the coated spherical corundum of the
invention, an increase of the G-factor up to 25% can be achieved.

Example 3

Grinding Tests (Deep Grinding)

As an analogy to the method described in Example 1, a coated spherical corundum of medium grain size of 260 μm (grain F60) was produced and processed into a ceramic-bonded grinding disk with dimensions of 500×65×203.2. By comparison and under the same conditions, aceramic-bonded disk with special fused alumina white (F60) was produced.

The above-mentioned grinding disks were used to deep-grind tool steel DIN 1.2242.

When compared to the disk with fused alumina white, the spherical corundum according to the invention achieved an approx. 17% increase in work speed without the work piece becoming tarnished or any loss of profile. Thus, advantages include time savings and increased machine utilization.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. An abrasive grain consisting of:
a core of fused spherical corundum, wherein the fused spherical corundum is a porous spherical $Al_2O_3$ body provided by back-filling a liquid melt with an air/water mixture;
fine-grained abrasive solid particles; and
at least one binder used to bind said fine-grained abrasive solid particles to said spherical corundum,
wherein the abrasive grain is characterized in that a thickness of a layer of said fine-grained abrasive solid particles ranges from 50 to 500 μm,
wherein the abrasive grain is characterized in that the contents of fine-grained abrasive solid particles amount to 20 to 40 wt.-percent, as relating to the overall solids content of the abrasive grain,
wherein the abrasive grain is characterized in that the abrasive grain has an open porosity of 10 to 30%, as well as a closed porosity of 60 to 90%, and a ratio of R of the overall porosity to the open porosity of 3 to 10, based on the following formula:

$$R = \frac{Porosity_{open} + Porosity_{closed}}{Porosity_{open}},$$

and
wherein the abrasive grain is characterized in that the abrasive grain has a bulk density of 0.5 to 1.0 kg/l.

2. The abrasive grain according to claim 1, wherein the spherical corundum having has a medium diameter ranging from 0.05 to 5 mm.

3. The abrasive grain according to claim 1, wherein the fine-grained abrasive solid particles have a medium diameter ranging between 0.1 and 100 μm.

4. The abrasive grain according to claim 1, wherein thickness of the layer ranges from 1/20 to 1/5 of the sphere's diameter.

5. The abrasive grain according to claim 4, wherein the layer is 5 times to 100 times a medium particle-size of the fine-grained abrasive solid particles.

6. The abrasive grain according to claim 1, wherein the abrasive grain shows a specific surface BET of 0.1 to 0.3 m²/g.

7. The abrasive grain according to claim 1, wherein the binder is an inorganic siliceous or phosphatic binder.

8. The abrasive grain according to claim 1, wherein the binder is an organic binder.

9. The abrasive grain according to claim 8, wherein the quantity of binders, as related to the overall solids content, amounts from 0.05 to 5 wt.-percent.

10. The abrasive grain according to claim 9, wherein the choice of fine-grained abrasive solid particles is selected from a group consisting of special fused aluminum oxide, standard corundum, semi-friable aluminum oxide, zirconic corundum, zirconic mullite, silicon carbide, diamond, and cubic boron nitride.

11. An abrasive grain consisting of:
a core of fused spherical corundum, wherein the fused spherical corundum is a porous spherical $Al_2O_3$ body provided by back-filling a liquid melt with an air/water mixture;
a coating layer consisting of:
fine-grained abrasive solid particles;
at least one binder used to bind said fine-grained abrasive solid particles to said spherical corundum, and
additives from a group consisting of sinter additives, cement molders and active grinding substances, such as sulfides, carbonates, halogenides, and phosphates from the group of elements that consist of N, K, Li, Mg, Ca, Al, Mn, Cu, Sn, Fe, Ti, Sb, and Zn,
wherein the abrasive grain is characterized in that a thickness of the coating layer of said fine-grained abrasive solid particles ranges from 50 to 500 μm,
wherein the abrasive grain is characterized in that the contents of fine-grained abrasive solid particles amount to 20 to 40 wt.-percent, as relating to the overall solids content of the abrasive grain,
wherein the abrasive grain is characterized in that the abrasive grain has an open porosity of 10 to 30%, as well as a closed porosity of 60 to 90%, and a ratio of R of the overall porosity to the open porosity of 3 to 10, based on the following formula:

$$R = \frac{Porosity_{open} + Porosity_{closed}}{Porosity_{open}},$$

and
wherein the abrasive grain is characterized in that the abrasive grain has a bulk density of 0.5 to 1.0 kg/l.

12. The abrasive grain according to claim 11, wherein the core consists of a hollow-sphere corundum from melted spherical corundum.

13. The abrasive grain according to claim 11, wherein the core consists of porous spherical corundum from melted spherical corundum.

14. An abrasive grain according to claim 2, wherein the fine-grained abrasive solid particles have a medium diameter ranging between 0.1 and 100 μm.

15. The abrasive grain according to claim 11, wherein the thickness of the coating layer ranges from 1/20 to 1/5 of the sphere's diameter.

16. The abrasive grain according to claim 15, wherein the coating layer is 5 times to 100 times the medium particle-size of the fine-grained abrasive solid particles.

* * * * *